United States Patent

Geller et al.

[15] 3,654,626

[45] Apr. 4, 1972

[54] THREE-DIMENSIONAL STORAGE SYSTEM USING F-CENTERS

[72] Inventors: Myer Geller; Daniel E. Altman, both of San Diego; Thomas A. De Temple, El Cerrito; Henry F. Taylor, San Diego, all of Calif.

[73] Assignee: The United States of America as represented by the Secretary of the Navy

[22] Filed: Sept. 17, 1969

[21] Appl. No.: 858,693

[52] U.S. Cl. ..........................340/173 CC, 178/7.87, 313/91, 350/160 R

[51] Int. Cl. ..........................G11c 13/04

[58] Field of Search .................340/173, 173 CC; 350/160 R; 178/7.87; 313/91

[56] References Cited

UNITED STATES PATENTS

| | | | |
|---|---|---|---|
| 3,296,594 | 1/1967 | Van Heerden | 340/173 X |
| 3,341,825 | 9/1967 | Schrieffer | 340/173 |
| 3,466,616 | 9/1969 | Bron | 340/173 |

FOREIGN PATENTS OR APPLICATIONS

| | | | |
|---|---|---|---|
| 1,103,861 | 2/1968 | Great Britain | 340/173 CC |

OTHER PUBLICATIONS

Van Heerden, Theory of Optical Information Storage in Solids, Applied Optics, April 1963, Vol. 2, No. 4, pp. 393–400

Schulman, Color Centers in Solids, 1962, pp. 100, 101.

Clapp, High Speed Optical Computers and Quantum Transition Memory Devices, 5/61, Proc. WJCC, V. 19, QA76E3, pp. 475, 478.

*Primary Examiner*—Bernard Konick
*Assistant Examiner*—Stuart Hecker
*Attorney*—J. C. Warfield, Jr., G. J. Rubens and J. W. McLaren

[57] ABSTRACT

A high intensity beam of energy is sharply focused to produce F-center coloration at points within a suitable material. The sharply focused energy is arranged to be selectively directed at a plurality of a great many discrete points in three dimensional array within the material; the presence or lack of F-center coloration can be employed to record a "one" or "zero" in binary fashion. The recorded F-center coloration may be read out by an indicated attenuation of a light beam focused at each point of interest, or by photo-conductivity, or other suitable means. When desired, the recorded coloration points may be erased by irradiation with a suitable F-band beam or white light. The concept of the disclosed system permits the recording of binary information having a density of approximately $10^{10}$ bits per cubic centimeter, and extremely high speed electro-optical input and read-out.

16 Claims, 5 Drawing Figures

INVENTORS.
HENRY F. TAYLOR
MYER GELLER
DANIEL E. ALTMAN
THOMAS A. DETEMPLE
BY
ATTORNEYS

INVENTORS.
HENRY F. TAYLOR
MYER GELLER
DANIEL E. ALTMAN
THOMAS A. DETEMPLE

BY [signature]

ATTORNEYS

THREE-DIMENSIONAL STORAGE SYSTEM USING F-CENTERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Efficient data processing and data computation depends to a large extent upon efficient data storage. Data storage in binary form has been accomplished by mechanical means such as punched tape, electromagnetic means such as magnetic recording, and a number of other ways. Generally speaking, in all data storage concepts the conservation of space has a high order of consideration. This implies that storage systems having higher density capabilities are more desirable in the same degree that the storage density is improved over known or other concepts.

Though F-center coloration in alkali haildes can be effected by many different techniques, and with the use of different kinds of energy such as X-rays, gamma rays, electron bombardment, etc., such F-centers are produced on the surface of the material thus limiting its employment to two dimensional concepts. However, it has been demonstrated that alkali halide crystals may be colored by two-photon absorption through the use of appropriate high intensity energy of a suitable wavelength so that the F-center coloration takes place within the interior of the material. This enables the generation of F-center colorations in a three-dimensional sense, greatly increasing the adaptability of such interior F-center colorations to particular practical usages.

The present invention has a capability of storing binary data in a three-dimensional array having a storage density of the order of approximately $10^{10}$ bits per cubic centimeter and is accordingly a most significant improvement over known high density storage systems of the prior art. Moreover, the concept of the present invention contemplates the use of electro-optical data input and read-out affording extremely high-speed operation.

SUMMARY OF THE INVENTION

The present invention contemplates employing a crystal material capable of developing F-center coloration by being irradiated with sharply focused, high intensity radiation at selected points. Accordingly, binary data information is recorded and stored in the form of F-center coloration effected at each irradiated focal point. A typical material which is found to be suitable for implementing the concept of the present invention is an alkali halide crystal such as potassium bromide, for example. A suitable source of radiation such as an ultraviolet laser, for instance, may be employed to cause F-center colorations at selected points within the crystal material and such points may have a three dimensional disposition within the material to enhance the storage density capabilities. Appropriate optical means is employed to focus the intense ultraviolet energy so that F-center coloration takes place substantially at the focal point of the focused ultraviolet energy.

The selectable points for data storage within the crystal may be a plurality of points, laid out in a substantially rectangular format at different depths within the crystal, each rectangular grid having a common plane within which it is possible to record, for example, a binary "one" by causing F-center coloration at that point or a binary "zero" by the absence of F-center coloration at that point.

The recorded and stored binary information may be read out of the system in several different ways. One technique employs the concept of focusing a beam of appropriate energy at each point which it is desired to read out and detecting the attenuation of the energy by reason of the F-center coloration. Detected attenuation may indicate a binary "one" for example, while the lack of such attenuation may indicate a recorded binary "zero."

Other methods of reading out the stored information such as detecting the changes in photo conductivity across an electric field during the illumination of F-center coloration points may be employed if desired.

By irradiation with appropriate energy such as white light, for example, the recorded energy in the form of F-center coloration points within the block of absorptive material may be bleached or "erased" to provide for the recordation of entirely new or additional information as may be desired.

Because the present invention conceives the storage of data by directing appropriate energy to a three-dimensional array of possible storage points within a suitable material, it is capable of extremely high-speed operation. The energy employed as taught by the present invention may be directed as desired by electro-optical means without reliance on mechanical movement. Accordingly, extremely rapid input and read-out of data is achieved of the order of several nanoseconds, due largely to the elimination of mechanical movement such as that inherently required by magnetic drum recording, tape recording, etc. Moreover, the extremely high speed of operation in recording and reading out data is inextricably inherent in the high density storage capabilities of present invention rather than requiring a compromise between these two desiderata.

Accordingly, it is a primary object of the present invention to provide an extremely high density binary storage system.

Another most important object of the present invention is to provide such a high density storage system which is adaptable to being practiced through the use of different materials and different types of energy.

An equally important object of the present invention is to provide such a high density binary storage system capable of recording and reading out data at extremely high speeds by electro-optical means.

Another most important object of the present invention is to provide such a high density binary storage system which is adaptable to providing read-out of the stored information by a selected one of several different types of techniques.

A further object of the present invention is to provide such a high density binary storage system in which the stored information may be quickly and readily erased to render the system ready to accept new or additional binary information for storage.

These and other features, objects, and advantages of the present invention will be better appreciated from an understanding of the operative principles of a preferred embodiment as described hereinafter and illustrated in the accompanying drawings.

The present invention contemplates an extremely high density binary storage system employing the phenomenon of coloration points which can be generated in certain types of materials. Information may be stored in an appropriate material such as a alkali halide crystal in a binary form, the binary data being indicated by the presence or absence of coloration at points in a three-dimensional array. The coloration of selected points is accomplished by the production of F-centers in the crystal material. One suitable arrangement was devised in accordance with the concept of the present invention by the employment of a potassium bromide crystal and the generation of F-centers by means of two-photon absorption effected by an ultraviolet laser beam focused at selected points within the potassium bromide crystal material.

Figure 1:
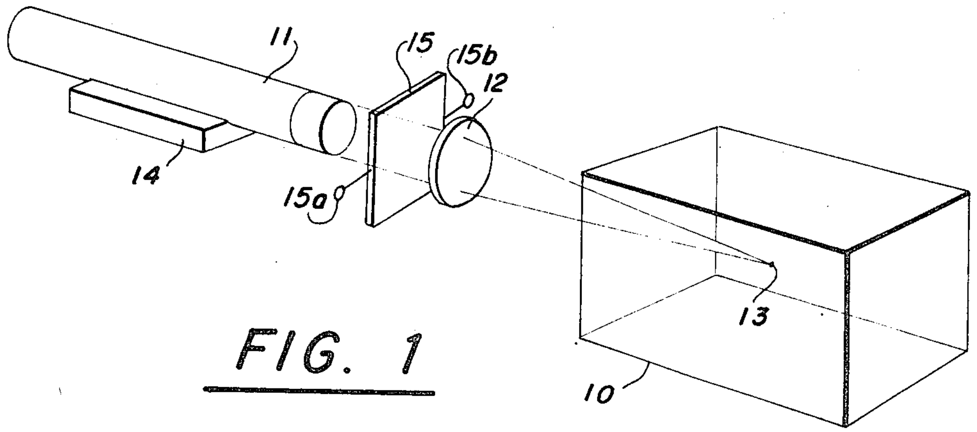
FIG. 1 is an isometric view of the principal elements employed in the present invention.

As illustrated in FIG. 1, a block of material 10 which is responsive to the absorption of energy of determinable wavelength for producing F-center coloration is disposed so as to be penetrable by energy emanating from a source such as the laser 11. An appropriate optical means 12, which may take the form of a lens, is positioned to focus the energy from the laser energy source 11 at a determinable focal point 13 within the block of absorptive material 10. The energy source 11 is mounted on a suitable support 14 which may be adapted to be controllably moved or positioned so as to direct the focal points of the energy to different positions within the three-dimensional volume of the absorptive material 10.

In a preferred embodiment of the present invention, the focused energy may be selectively directed to any desired point in a three-dimensional sense by a wholly electro-optical technique, such as electrically controlled beam deflection which may be given effect by passing the energy from the source 11 through an appropriate material 15 such as ammonium dihydrogen phosphate which exhibits a change of index of refraction as a function of an electrical potential applied to its terminals 15*a* and 15*b*. This type of arrangement affords extremely rapid access for input and read-out purposes since a beam may be controllably deflected as desired in several nanoseconds.

Figure 2:
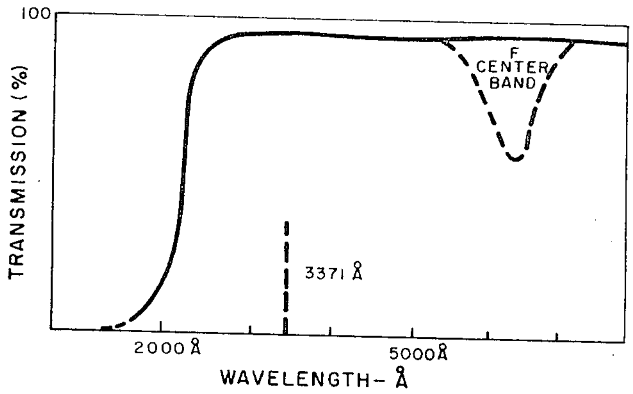
FIG. 2 is a graphical illustration of the absorption characteristics of a typical material which may be employed in the practice of the present invention.

FIG. 2 illustrates the absorption characteristics of a typical material suitable to employment within the concept of the present invention. The graphical characteristic illustrated in FIG. 2 is that of potassium bromide which is capable of two photon absorption of ultraviolet energy generated at approximately 3,371 A by a nitrogen gas laser. The characteristic illustrated in FIG. 2 also indicates the F-center band at 6,250 A confirming that the potassium bromide material can be restored to its original transparency by bleaching the color centers with illumination in the indicated F-center absorption band.

It is to be understood that F-center coloration may be given effect over a considerable range of wavelengths beginning approximately at the wavelength where the material becomes substantially absorptive and extending to a value of approximately twice that wavelength. For example, in the potassium bromide characteristics illustrated in FIG. 2 the range of such wavelengths may extend from approximately 2,000 A to 4,000 A.

As is indicated by the graphic illustration of the characteristic of potassium bromide shown in FIG. 2, the material is almost wholly transparent to energy of a greater wavelength than approximately 2,000 A. However, if the intensity of the energy is sufficiently high, two photons behave as if their wavelength were one-half the actual wavelength; that is to say, that high intensity energy in the ultraviolet range of 3,371 A behaves as if it were actually approximately 1,685 A with the result that the energy is absorbed by the crystal at the focal point and an F-center is generated within the three dimensional interior volume of the material. Thus, an F-center coloration is created internally as illustrated substantially in the isometric view of the combination of apparatus shown in FIG. 1.

Figure 3:
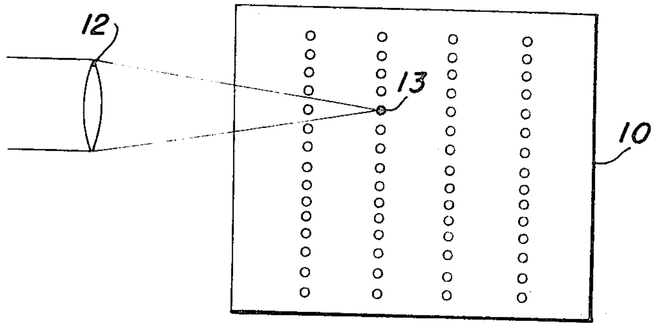
FIG. 3 is an illustration of the manner in which F-center coloration points may be generated in a typical material for the high density storage of binary data.

FIG. 3 illustrates the manner in which F-center coloration may be generated at a plurality of points within suitable material through the use of a high intensity focused beam of appropriate energy. The illustration of FIG. 3 employs the same numerical designations as FIG. 1 for like elements. The source of suitable high intensity energy is focused by an optical means 12 to be concentrated at the focal point indicated at 13 thereby creating an F-center coloration point and recording binary data for interior storage; as was previously mentioned, the F-center coloration point may symbolize a binary "one," while the absence of an F-center coloration at a particular point may be designated to represent a binary "zero." A plurality of predetermined points such as those illustrated within the block of F-center coloration responsive material 10, provide an extremely high density storage means.

Figure 4:
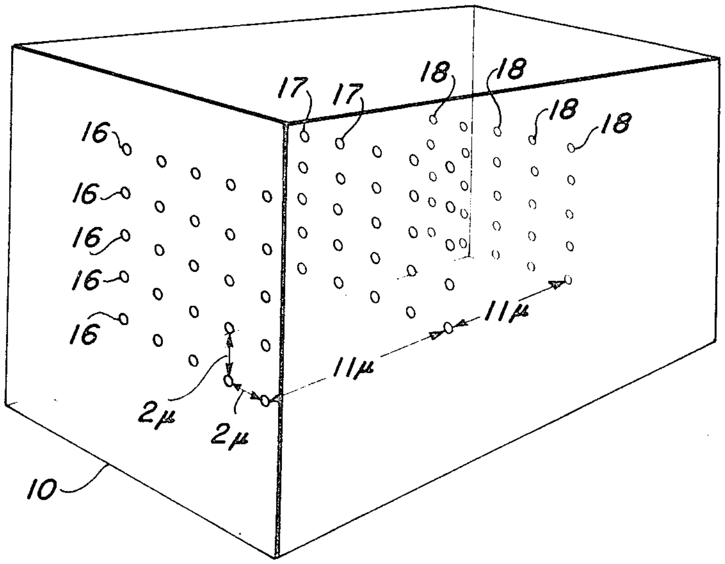
FIG. 4 is a schematic isometric illustration of the manner in which high density storage may be effected in a three-dimensional manner within a suitable material in accordance with the the teachings of the present invention.

FIG. 4 illustrates in a three-dimensional, perspective view, the manner in which a large plurality of predetermined storage points may be laid out within suitable material for availability as binary storage means. As illustrated in FIG. 4, a block of material 10 shows a plurality of points 16 laid out in a substantially rectangular format lying in a common plane. A second plurality of similar points 17 are disposed in a similar rectangular format within a second common plane displaced from the first plane in which the points 16 were disposed. In a similar manner, a third plurality of points 18 are disposed in a substantially identical rectangular format within a common plane displaced from both the planes in which the points 16 and 17 lie.

It has been found that by the use of coherent light, such as that derived from a suitable laser source, the predetermined format of possible points which may be used for storage of binary data may be disposed very closely because of the concentration of coherent energy and also because of the desirable characteristics of coherent light which results in a minimum of diffraction and spreading of the light energy. Accordingly, the points 16, for example, which lie in a common plane, may be spaced as little as 2 microns apart in a rectangular format. Moreover, the distance between the planes in which the respective groups 16, 17 and 18 lie may be as little as 11 microns. Accordingly, the concept of the present invention when employing a suitable coherent energy source, provices a binary data storage system in which the density of the stored data can be as high as $10^{10}$ bits per cubic centimeter. It will be understood of course, that because extremely small dimensions are involved (of the order of only several microns) it is impractical to represent certain of the parameters inherent in the concept of the present invention by truly scalar illustrations. Therefore, it should be appreciated that the illustrations comprising the drawings are largely schematic in nature and do not represent scalar relationships.

Figure 5:
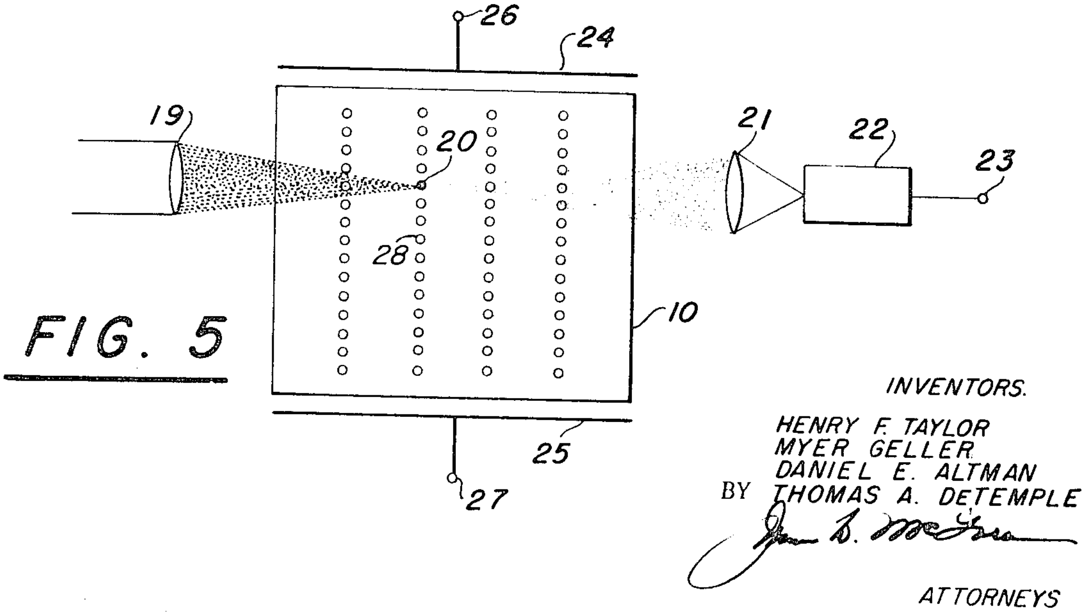
FIG. 5 is a schematic illustration of the manner in which the stored binary data may be read out of a suitable material in accordance with the teachings of the present invention.

FIG. 5 illustrates the manner in which stored binary data recorded in accordance with the concept and teaching of the present invention may be read out to provide an input as desired for other data processing means. In FIG. 5 the block of material 10, having a plurality of predetermined points at which binary information may be recorded by F-center coloration, is scanned by a light source focused by an appropriate means, such as a lens 19, upon each of the plurality of predetermined points at which binary information may be stored.

When F-center coloration is present, such as is indicated by the darkened point 20, the light energy focused by the lens 19 at the point 20 will be attenuated. Thus, the amount of light energy reaching the lens 21 and transmitted thereby to a suitable energy-responsive means 22, will be attenuated in intensity. The energy responsive means 22 will accordingly sense an attenuated amount of energy, indicating a binary "one," for example, and generating an appropriate output at the terminal 23. As the beam of light is directed to other points such as point 28 which is not darkened by F-center coloration, the amount of light energy reaching the lens 21 and transmitted to the light-sensitive detector 22 will be unattenuated. This will cause the light-responsive means 22 to provide an output indicative of a binary "zero" at its output terminal 23.

Extremely high-speed read-out may be effected by employing electrically controlled beam deflection substantially in the manner described in connection with the explanation of the operation of the apparatus illustrated in FIG. 1.

Other means may be employed to detect the presence or absence of F-center coloration at each predetermined recording point for developing an output commensurate with the stored binary data information. For example, conductive plates such as those illustrated at 24 and 25 in FIG. 5, may be provided and an electrical potential applied to their respective terminals 26 and 27. When F-band radiation is directed at a point having F-center coloration such as 20, energy in the form of electrons will be released, increasing the current flow between the plates 24 and 25 which may be readily sensed by appropriately responsive means indicating that the point being scanned is representative of a binary "one." Conversely, when a point such as 28 is scanned by F-band concentrated radiation, no electrons will be released because of the lack of F-center coloration and the concomitant two-photon absorption, with the result that no increase of current flow is detected between the plates 24 and 25. This, of course, indicates that the point 28 represents a recorded binary "zero." All the points in the three-dimensional array, as illustrated in FIG. 4 may thus be scanned to detect the stored binary data contained within each point.

When it is desired to "erase" the stored data, a block of material 10 as shown in the several illustrations, may be illuminated with F-band irradiation or white of sufficient intensity over an appropriate length of time so that the F-center colorations are bleached from the material. Preferably a high intensity F-band beam may be employed in the presence of a strong electric field or at an elevated temperature of the order of 100° C. Thus, while the read out procedure conceived by the present invention is non-destructive of the recorded binary data, the present invention nonetheless lends itself readily to re-use of the storage element by eliminating the entire amount of previously stored data in a convenient, efficient, and readily adaptable manner.

It should be appreciated that the concept of the present invention is not limited to the employment of alkali halides but may be practiced through the use of any suitable material capable of exhibiting the F-center coloration phenomenon as desired. For example, F-center coloration can be generated in a variety of insulated crystals and glasses such as calcium fluoride, barium oxide, magnesium oxide, strontium sulfate, sapphire, quartz, diamonds, silicon, germanium, alkali disilicate, silver activated phosphate glasses, and also in a variety of organic compounds such as alcohols, ethers, esters, and ketones.

From the foregoing disclosure and teaching it will be evident that the concept of the present invention provides a data storage capability of extremely high density of the order of $10^{10}$ bits per cubic centimeter and of very rapid access of the order of a few nanoseconds for input and read-out purposes.

Obviously many modifications and variations of the present invention are possible in the light of the above teachings. It is therefore to be understood that within the scope of the appended claims the invention may be practiced otherwise than as specifically described.

What is claimed is:

1. A high density binary storage system comprising:

a block of material substantially absorptive of energy within a spectral range of determinable wavelengths and substantially transparent to higher wavelength energy;

a source of said higher wavelength energy;

means for concentrating said higher wavelength energy in sufficiently high intensity at a selectable focal point in said material for producing two-photon absorption substantially equivalent to single-photon absorption within said spectral range at one-half the wavelength of said higher wavelength, and creating resultant F-center coloration at said selectable focal point; and means for changing the spatial disposition of said selectable focal point to any point of a plurality of discrete points disposed in a predetermined three-dimensional, multi-planar, orthogonal format within said material for recording binary data in binary code by the creation of said two-photon absorption F-center coloration at certain of said selectable points in accordance with said data.

2. A high density, binary storage system as claimed in claim 1 wherein said material is an alkali halide.

3. A high density, binary storage system as claimed in claim 1 wherein said source of energy is a laser beam.

4. A high density, binary storage system as claimed in claim 1 wherein said source of energy is an ultraviolet laser beam.

5. A high density, binary storage system as claimed in claim 1 wherein said means for changing the spatial disposition of said focal point is electro-optically controlled.

6. A high density, binary storage system as claimed in claim 5 wherein said means for changing the spatial disposition of said focal point includes a material capable of exhibiting a change of index of refraction responsive to applied electrical energy.

7. A high density, binary storage system as claimed in claim 1 wherein said material is potassium bromide.

8. A high density, binary storage system as claimed in claim 7 wherein said source of energy is in the ultraviolet wavelength region.

9. A high density, binary storage system as claimed in claim 1 and including means for detecting the presence of F-center coloration at any of said plurality of discrete points.

10. A high density, binary storage system as claimed in claim 9 wherein said means for detecting the presence of F-center coloration includes an electro-optically controlled beam of radiation.

11. A high density, binary storage system as claimed in claim 9 wherein said means for detecting the presence of F-center coloration comprises a source of radiation adapted to be directed to each said point and radiation responsive means for sensing attenuation of said radiation due to said F-center coloration points.

12. A high density, binary storage system as claimed in claim 9 wherein said means for detecting the presence of F-center coloration comprises electric potential impressed across said material, an F-band beam adapted to be directed at any of said points, and means for detecting changes in current flow across said material.

13. A high density, binary storage system as claimed in claim 1 and including means for non-destructively erasing said F-center coloration.

14. A high density, binary storage system as claimed in claim 13 wherein said means for non-destructively erasing said F-center coloration comprises an F-band irradiation beam.

15. A high density, binary storage system as claimed in claim 14 wherein said F-band irradiation is applied in the presence of an electric field.

16. A high density, binary storage system as claimed in claim 14 wherein said F-band irradiation is applied in the presence of an elevated temperature.

* * * * *